US010063049B1

(12) United States Patent
Gill et al.

(10) Patent No.: US 10,063,049 B1
(45) Date of Patent: Aug. 28, 2018

(54) APPARATUS, SYSTEM, AND METHOD FOR IMPROVING THE POWER EFFICIENCY OF TELECOMMUNICATIONS DEVICES

(71) Applicant: Juniper Networks, Inc., Sunnyvale, CA (US)

(72) Inventors: Jaspal S. Gill, Tracy, CA (US); David K. Owen, Livermore, CA (US); Michael Braylovskiy, San Mateo, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

(21) Appl. No.: 14/870,001

(22) Filed: Sep. 30, 2015

(51) Int. Cl.
*H02J 1/00* (2006.01)

(52) U.S. Cl.
CPC ...................... *H02J 1/00* (2013.01)

(58) Field of Classification Search
CPC ........................................ H02J 9/062
USPC ........................................ 307/66
See application file for complete search history.

(56) References Cited

U.S. PATENT DOCUMENTS

| 6,225,708 B1* | 5/2001 | Furukawa | G06F 1/30 307/23 |
| 8,253,277 B2* | 8/2012 | Lin | H02J 1/108 307/43 |
| 2010/0066431 A1* | 3/2010 | Carter | H02J 1/10 327/408 |
| 2011/0291482 A1* | 12/2011 | Siulinski | H02J 9/061 307/64 |
| 2012/0086276 A1* | 4/2012 | Sawyers | H02J 1/12 307/66 |

* cited by examiner

Primary Examiner — Daniel Kessie
(74) Attorney, Agent, or Firm — FisherBroyles, LLP (57) ABSTRACT

The disclosed apparatus may include (1) at least one unregulated power input that facilitates feeding unregulated electrical power to a telecommunications device, (2) at least one regulated power input that facilitates feeding regulated electrical power to the telecommunications device, and (3) at least one ORing power device that (A) provides unregulated electrical power from the unregulated power input to the telecommunications device when the unregulated electrical power is above a certain threshold and (B) provides regulated electrical power from the regulated power input to the telecommunications device when the unregulated electrical power is below the certain threshold. Various other apparatuses, systems, and methods are also disclosed.

20 Claims, 7 Drawing Sheets

APPARATUS, SYSTEM, AND METHOD FOR IMPROVING THE POWER EFFICIENCY OF TELECOMMUNICATIONS DEVICES

BACKGROUND

Telecommunications devices (such as routers and switches) often include redundant Direct Current (DC) power sources. For example, a telecommunications device may include a primary DC power source that provides electrical power to certain electrical components (such as control cards, fabric cards, and/or line cards) that facilitate communication with other telecommunications devices. In this example, the telecommunications device may also include a backup DC power source that provides electrical power to those electrical components in the event that the primary DC power source experiences a system fault.

Although redundant DC power sources may enable telecommunications devices to continue operating properly despite a system fault, some traditional power configurations may have one or more shortcomings and/or inefficiencies. For example, a telecommunications device may include primary and backup DC power sources capable of feeding electrical power to a set of electrical components via pass-through Power Entry Modules (PEMs). In this example, the pass-through PEMs may each include an ElectroMagnetic Interference (EMI) filter that forms a source path that feeds electrical current to the set of electrical components and a return path that carries the electrical current from the electrical components to a common ground at the chassis of the telecommunications device.

Unfortunately, since both of these pass-through PEMs include a different return path to the common ground, the actual return path of the electrical current may essentially be undefined and/or unpredictable. As a result, this traditional power configuration may fail to provide effective fault isolation. For example, in the event that the primary DC power source experiences a system fault, the return paths of both the primary DC power source and the backup DC power source may carry some of the fault current to the common ground. Consequently, the backup DC power source may experience a disturbance that potentially causes the telecommunications to malfunction.

In another example, a telecommunications device may include primary and backup DC power sources capable of feeding electrical power to a set of electrical components via multi-input DC-to-DC Power Supply Modules (PSMs). In this example, the DC-to-DC PSMs may each include an input for the primary DC power source and another input for the backup power source. These DC-to-DC PSMs may each form a source path that feeds electrical current to the set of electrical components and multiple return paths that carry the electrical current from the electrical components to a common ground at the chassis of the telecommunications device. Unfortunately, the DC-to-DC PSMs in this traditional power configuration may have undefined and/or unpredictable return paths for the electrical current due to the multiple return paths to the common ground. In addition, this traditional power configuration may involve a certain amount of power loss (e.g., an approximately 10% loss of power) and/or an increase in heat or operating temperature as a result of the DC-to-DC conversion.

In an additional example, a telecommunications device may include primary and backup DC power sources capable of feeding electrical power to a set of electrical components via single-input DC-to-DC PSMs. In this example, the DC-to-DC PSMs may each include a single input for a DC power source (whether the primary power source or the backup power source). As a result, the DC-to-DC PSMs in this traditional power configuration may have defined and/or predictable return paths. However, this traditional power configuration may call for twice the number of PSMs, thereby potentially increasing manufacturing costs and spatial requirements. Moreover, this traditional power configuration, too, may involve a certain amount of power loss (e.g., an approximately 10% loss of power) and/or an increase in heat or operating temperature as a result of the DC-to-DC conversion.

The instant disclosure, therefore, identifies and addresses a need for apparatuses, systems, and methods for improving the power efficiency of telecommunications devices.

SUMMARY

As will be described in greater detail below, the instant disclosure generally relates to apparatuses, systems, and methods for improving the power efficiency of telecommunications devices. In one example, an apparatus for accomplishing such a task may include (1) at least one unregulated power input that facilitates feeding unregulated electrical power to a telecommunications device, (2) at least one regulated power input that facilitates feeding regulated electrical power to the telecommunications device, and (3) at least one ORing power device that (A) provides unregulated electrical power from the unregulated power input to the telecommunications device when the unregulated electrical power is above a certain threshold and (B) provides regulated electrical power from the regulated power input to the telecommunications device when the unregulated electrical power is below the certain threshold.

Similarly, a telecommunications device incorporating the above-described apparatus may include a power distribution unit that distributes electrical power to the telecommunications device. This power distribution unit may include (1) at least one unregulated power input that facilitates feeding unregulated electrical power to the telecommunications device, (2) at least one regulated power input that facilitates feeding regulated electrical power to the telecommunications device, and (3) at least one ORing power device that (A) provides unregulated electrical power from the unregulated power input to the telecommunications device when the unregulated electrical power is above a certain threshold and (B) provides regulated electrical power from the regulated power input to the telecommunications device when the unregulated electrical power is below the certain threshold.

A corresponding method may include (1) electrically coupling at least one unregulated power input that facilitates feeding unregulated electrical power to an ORing power device of a telecommunications device, (2) electrically coupling at least one regulated power input that facilitates feeding regulated electrical power to the ORing power device of the telecommunications device, and then (3) performing, by the ORing power device, at least one logical OR operation on the unregulated power input and the regulated power input such that the ORing power device (A) provides unregulated electrical power from the unregulated power input to the telecommunications device when the unregulated electrical power is above a certain threshold and (B) provides regulated electrical power from the regulated power input to the telecommunications device when the unregulated electrical power is below the certain threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for improving the power efficiency of telecommunications devices. As will be explained in greater detail below, embodiments of the instant disclosure may produce and/or represent a hybrid power configuration and/or architecture that improves the power efficiency of telecommunications devices and/or advances green technology. For example, embodiments of the instant disclosure may include a combination of unregulated and regulated power sources used to provide primary and/or backup power to a telecommunications device. In this example, the unregulated power sources may be configured and/or set to feed electrical power to various electrical components (such as control cards, fabric cards, and/or line cards) of the telecommunications device via pass-through PEMs while the amount of electrical power originating from the unregulated power sources is maintained above a certain threshold (e.g., approximately 50 volts). In the event that the amount of electrical power originating from an unregulated power source dips and/or drops below that threshold, a corresponding regulated power source may begin feeding electrical power to the electrical components via a PSM that performs a DC-to-DC conversion on the electrical power.

In this exemplary hybrid power configuration and/or architecture, the electrical power fed by the unregulated and regulated power sources may always have a defined and/or predictable return path. As a result, this hybrid power configuration and/or architecture may provide and/or facilitate effective fault isolation such that the regulated backup power source is able to feed electrical power to the electrical components without any significant disturbances in the event of a system fault. In addition, this hybrid power configuration and/or architecture may increase the power efficiency of a telecommunications device by operating primarily on the unregulated power source and relying on the regulated backup power source only in the event that the unregulated power source is no longer able to produce a certain threshold level of electrical power.

The following will provide, with reference to FIGS. 1-5, examples of circuit components and configurations that may facilitate improving the power efficiency of telecommunications devices. The discussion corresponding to FIG. 6 will provide a detailed description of an exemplary method for improving the power efficiency of telecommunications devices. Finally, the discussion corresponding to FIG. 7 will provide numerous examples of systems that may include and/or incorporate the components and circuits shown in FIGS. 1-5.

Figure 1:
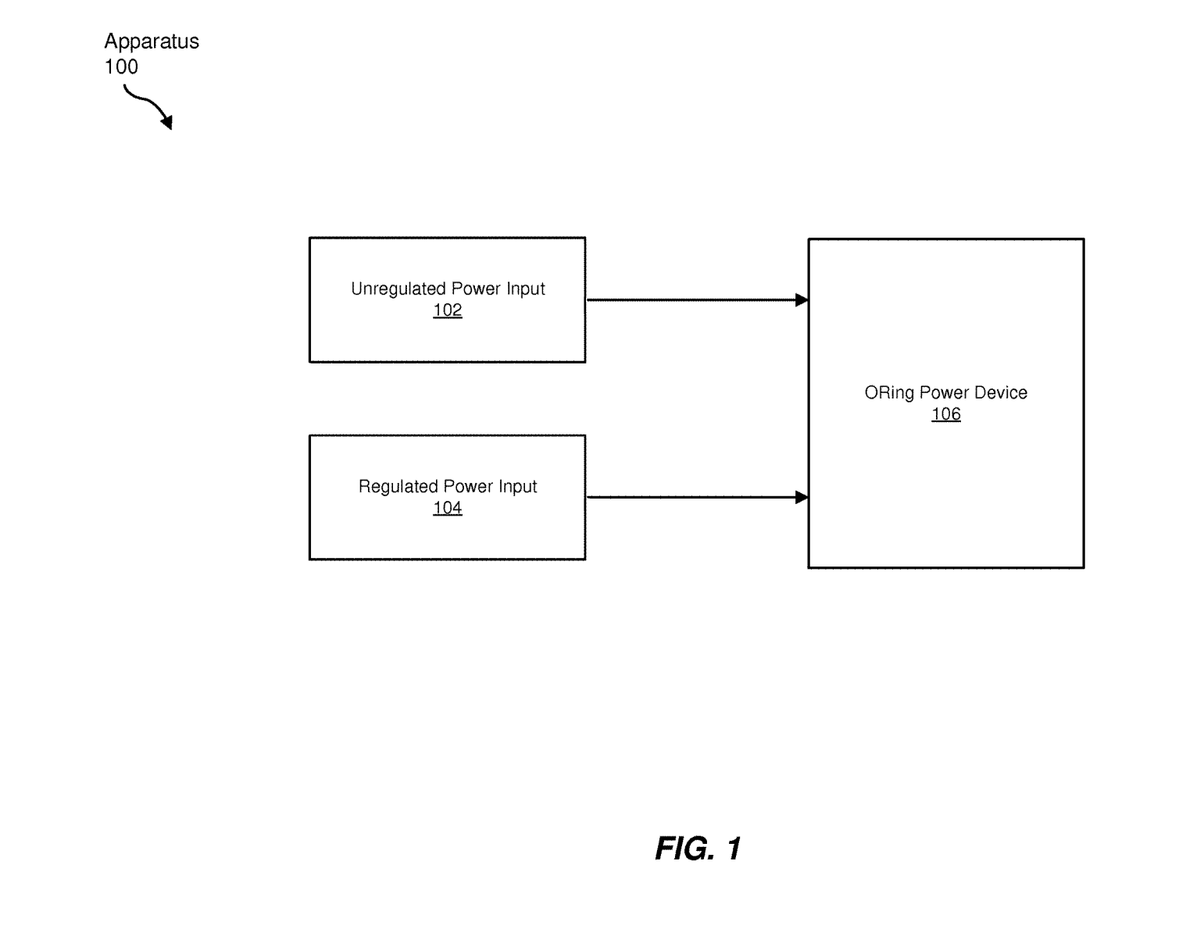
FIG. 1 is a block diagram of an exemplary apparatus for improving the power efficiency of telecommunications devices.

FIG. 1 shows a block diagram of an exemplary apparatus 100 for improving the power efficiency of telecommunications devices. Apparatus 100 generally represents any set or combination of electrical components that facilitate improving the power efficiency of telecommunications devices. In some examples, apparatus 100 may include and/or represent a power management and/or distribution configuration or architecture that feeds electrical power to or within a telecommunications device (such as telecommunications device 206). Examples of the telecommunications device include network devices, routers, switches, hubs, modems, bridges, repeaters, gateways, multiplexers, network adapters, network racks, chasses, portions of one or more of the same, variations of one or more of the same, combinations of one or more of the same, or any other suitable telecommunications device.

As shown in FIG. 1, apparatus 100 may include at least one ORing power device 106 electrically coupled to an unregulated power input 102 and a regulated power input 104. The term "ORing power device," as used herein, generally refers to any type or form of physical hardware, circuit, device, and/or processor that ORs (e.g., performs a logical OR operation on) electrical power provided by different power sources. Examples of ORing power device 106 include, without limitation, diodes (such as ORing diodes), active ORing devices, transistors (such as Metal-Oxide-Semiconductor Field-Effect Transistors (MOSFETs)), variations of one or more of the same, combinations of one or more of the same, or any other suitable type or form of ORing power device.

In some examples, ORing power device 106 may represent a portion of a circuit. For example, ORing power device 106 may include a conductor that connects the output of unregulated power input 102 to the anode of an ORing diode or the source of a MOSFET. In this example, ORing power device 106 may also include another conductor that connects the output of regulated power input 104 to the anode of another ORing diode or the source of another MOSFET. ORing power device 106 may further include a conductor that connects the cathodes of both ORing diodes or the drains of both MOSFETs to a set of electrical components such that the cathodes or drains are connected to one another and enable electrical power to flow to the electrical components.

Figure 2:
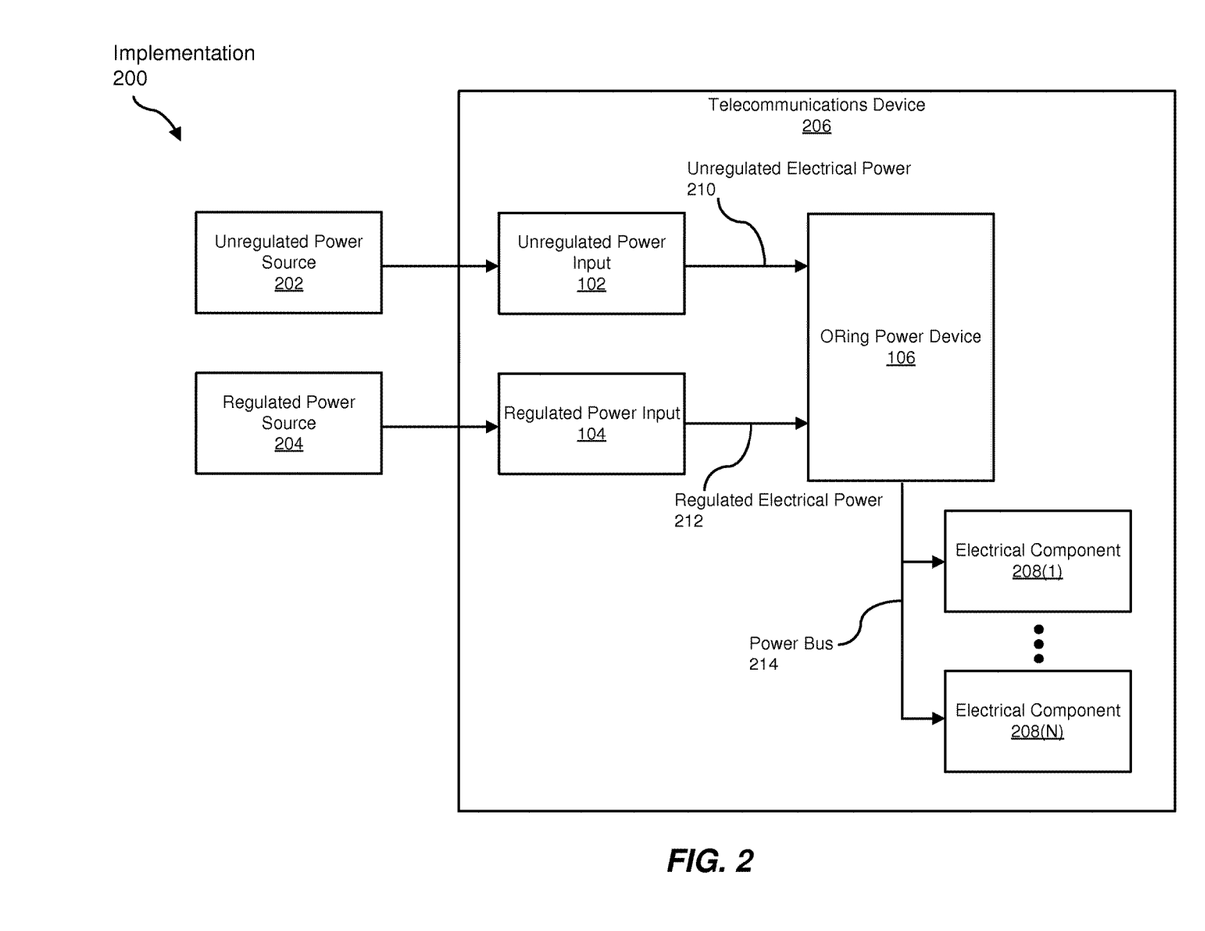
FIG. 2 is a block diagram of an exemplary implementation of an apparatus for improving the power efficiency of telecommunications devices.

In this configuration, ORing power device 106 may provide electrical power from whichever power source (e.g., unregulated power source 202 or regulated power source 204 in FIG. 2) has a higher voltage level. For example, an unregulated power source connected to unregulated power input 102 may have a voltage level that is higher than a regulated power source connected to regulated power input 104. In this example, electrical power originating from the unregulated power source may flow to the electrical components. However, in the event that the voltage level of the unregulated power source dips or drops below the voltage level of the regulated power source, electrical power originating from the regulated power source may flow to the electrical components. ORing device 106 may also prevent electrical power originating from one of those power sources from flowing back toward the other power source.

Although FIG. 1 illustrates only one ORing power device 106 electrically coupled to both unregulated power input 102 and regulated power input 104, ORing power device 106 may include and/or represent a plurality of ORing power devices or an ORing power device with multiple inputs. For example, a first ORing device (such as a diode or MOSFET) may be electrically coupled to unregulated power input 102, and a second ORing device (such as another diode or MOSFET) may be electrically coupled to regulated power input 104. Additionally or alternatively, a single ORing device may include a first diode and/or MOSFET that is electrically coupled to unregulated power input 102, and a second diode and/or MOSFET that is electrically coupled to regulated power input 104.

The term "unregulated power input," as used herein, generally refers to any type or form of power input, connector, wiring harness, and/or terminal that facilitates the flow of electrical power that is unregulated, unconverted, and/or non-isolated. In one example, unregulated power input 102 may include and/or represent a pass-through PEM that connects to and/or interfaces with an unregulated power source capable of feeding and/or providing unregulated electrical power to the electrical components. In this example, the pass-through PEM may include an EMI filter that filters and/or conditions the electrical power fed and/or provided from the unregulated power source. Additionally or alternatively, the unregulated power source may be terminated directly to the pass-through PEM. Examples of such an unregulated power source include, without limitation, batteries, unregulated DC power supplies, diode rectifiers, variations of one or more of the same, combinations of one or more of the same, or any other suitable unregulated power source.

The term "regulated power input," as used herein, generally refers to any type or form of power input, connector, wiring harness, and/or terminal that facilitates the flow of electrical power that is regulated, converted, and/or isolated. In one example, regulated power input 104 may include and/or represent a DC-to-DC PSM that connects to and/or interfaces with a regulated power source capable of feeding and/or providing regulated electrical power to the electrical components. In this example, the regulated power source may be terminated directly to the DC-to-DC PSM. Additionally or alternatively, the regulated power source may feed and/or provide regulated electrical power to the electrical components of the telecommunications device via the DC-to-DC PSM. Examples of such a regulated power source include, without limitation, DC power supplies, linear regulated power supplies, switch-mode power supplies, programmable power supplies, Uninterruptible Power Supplies (UPSes), variations of one or more of the same, combinations of one or more of the same, or any other suitable regulated power source.

FIG. 2 shows an exemplary implementation 200 of apparatus 100 for improving the power efficiency of a telecommunications device 206. As shown in FIG. 2, implementation 200 may include and/or represent telecommunications device 206 that incorporates and/or is powered through or in connection with apparatus 100. For example, telecommunications device 206 may include ORing power device 106 electrically coupled to an unregulated power source 202 via unregulated power input 102 and/or a regulated power source 204 via regulated power input 104. In this example, unregulated power source 202 may be capable of feeding and/or providing unregulated electrical power 210 to ORing power device 106, and regulated power source 204 may be capable of feeding and/or providing regulated electrical power 212 to ORing power device 106.

As shown in FIG. 2, telecommunications device 206 may include a power bus 214 that represents and/or carries the output voltage feed from ORing power device 106. In one example, power bus 214 may be electrically coupled to the power output of ORing power device 106 and the power inputs of electrical components 208(1)-(N). In this example, ORing power device 106 may pass unregulated electrical power 210 from unregulated power source 202 to one or more of electrical components 208(1)-(N) via power bus 214. Additionally or alternatively, ORing power device 106 may pass regulated electrical power 212 from regulated power source 204 to one or more of electrical components 208(1)-(N) via power bus 214.

Examples of electrical components 208(1)-(N) include, without limitation, control cards, fabric cards, line cards, Physical Interface Cards (PICs), Flexible PIC Concentrators (FPCs), Switch Interface Boards (SIBs), routing engines, communication ports, fan trays, Field-Replaceable Units (FRUs), backplanes, connector interface panels, variations of one or more of the same, combinations of one or more of the same, or any other suitable electrical components.

In some examples, ORing power device 106 may control and/or regulate whether unregulated electrical power 210 and/or regulated electrical power 212 is fed and/or provided to electrical components 208(1)-(N) via power bus 214. For example, ORing power device 106 may pass unregulated electrical power 210 to electrical components 208(1)-(N) while the voltage level of unregulated electrical power 210 is above a certain threshold (e.g., approximately 50 volts). This threshold may correspond to and/or be represented by the voltage level of regulated electrical power 212 (e.g., approximately 50 volts) outputted by regulated power input 104. In the event that the voltage level of unregulated electrical power 210 dips or drops below the threshold, ORing power device 106 may pass regulated electrical power 212 to electrical components 208(1)-(N). However, in the event that the voltage level of unregulated electrical power 210 rises again above a certain threshold (whether the same threshold or a higher hysteresis-type threshold) due to charging of unregulated power source 202, ORing power device 106 may again pass unregulated electrical power 210 to electrical components 208(1)-(N).

In one example, ORing power device 106 may pass only unregulated electrical power 210 to electrical components 208(1)-(N). In another example, ORing power device 106 may pass only regulated electrical power 212 to electrical components 208(1)-(N). In a further example, ORing power device 106 may pass a combination of unregulated electrical power 210 and regulated electrical power 212 by supplementing depleted electrical power 210 with regulated electrical power 212.

In some examples, unregulated power source 202 may include and/or represent a battery charged with DC power. In one example, apparatus 100 and/or telecommunications device 206 may include a rectifier (not illustrated in FIG. 1 or 2) that converts incoming Alternating Current (AC) power to DC power used to recharge the battery. The battery may feed and/or provide unregulated electrical power 210 to electrical components 208(1)-(N) of telecommunications device 206 via a pass-through PEM. This pass-through PEM may include an EMI filter that filters and/or conditions unregulated electrical power 210. Additionally or alternatively, this pass-through PEM may include an ORing diode or MOSFET that facilitates passing unregulated electrical power 210 to electrical components 208(1)-(N) until unregulated electrical power 210 dips or drops below the voltage level of regulated electrical power 212 outputted by regulated power input 104.

In some examples, regulated power source 204 may include and/or represent a DC power supply. In one example, the DC power supply may feed and/or provide regulated electrical power 212 to electrical components 208(1)-(N) of telecommunications device 206 via a DC-to-DC PSM. This DC-to-DC PSM may include an EMI filter that filters and/or conditions regulated electrical power 212. Additionally or alternatively, this DC-to-DC PSM may include an ORing diode or MOSFET that facilitates passing regulated electrical power 212 to electrical components 208(1)-(N) once unregulated electrical power 210 dips or drops below the voltage level of regulated electrical power 212.

Figure 3:
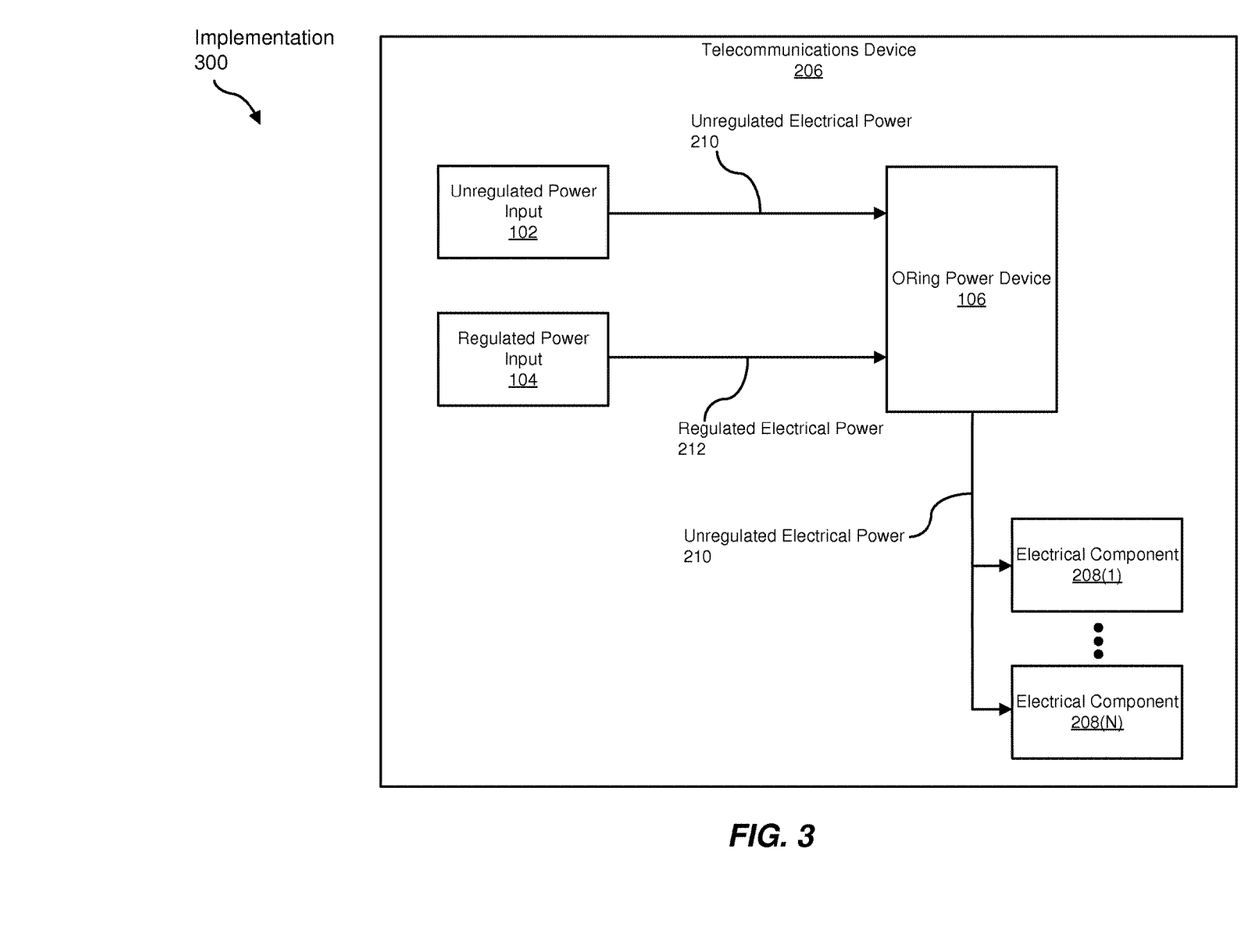
FIG. 3 is a block diagram of an exemplary implementation of an apparatus for improving the power efficiency of telecommunications devices.

FIG. 3 shows an exemplary implementation 300 of apparatus 100 for improving the power efficiency of telecommunications device 206. As shown in FIG. 3, implementation 300 may involve ORing power device 106 enabling unregulated electrical power 210 to flow from unregulated power input 102 to electrical components 208(1)-(N). In this example, the voltage level of unregulated electrical power 210 may measure above a certain threshold (such as the voltage level of regulated electrical power 212). As a result, ORing power device 106 may pass and/or direct unregulated electrical power 210 (instead of regulated electrical power 212) to electrical components 208(1)-(N).

Figure 4:
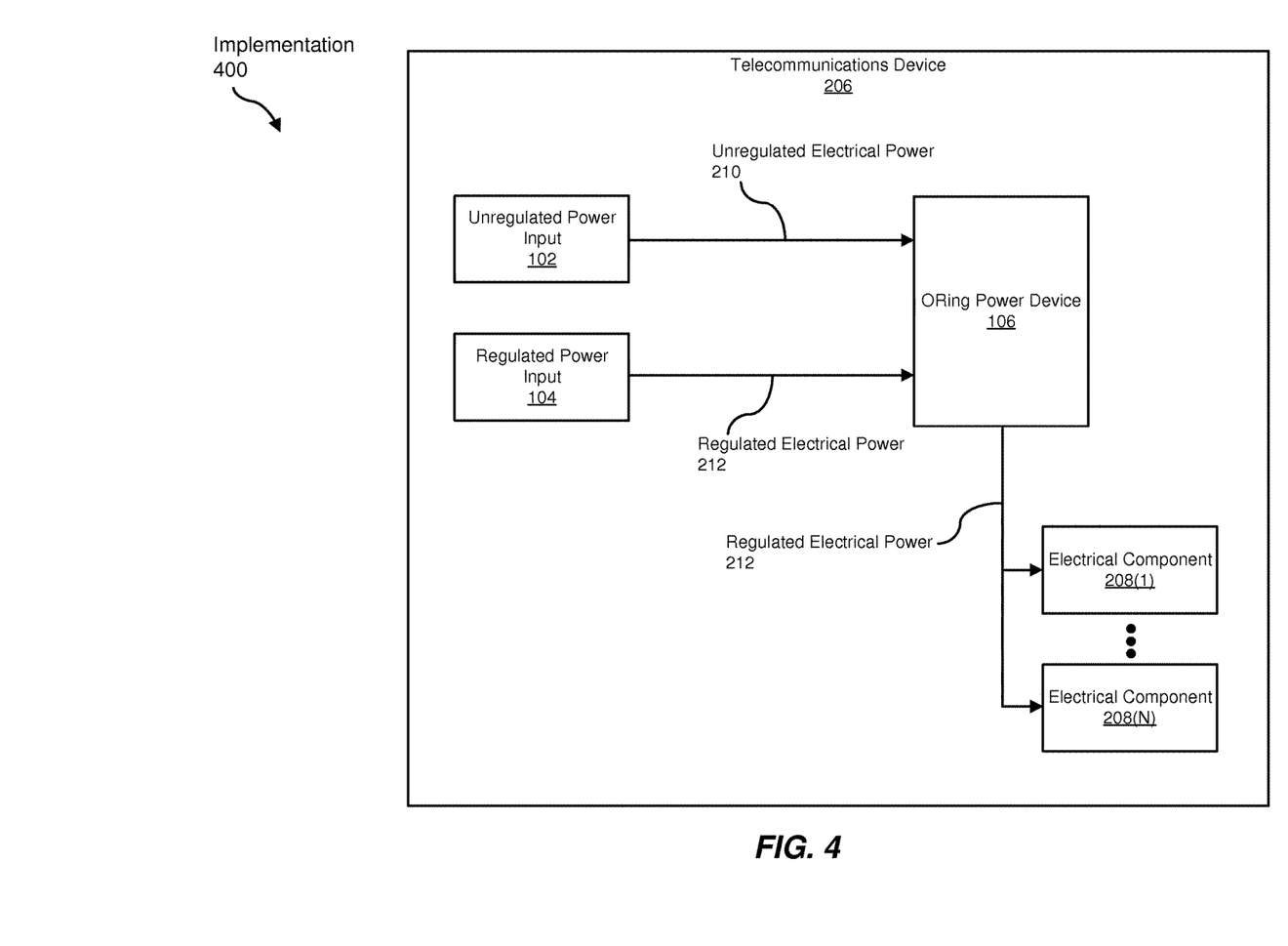
FIG. 4 is a block diagram of an exemplary implementation of an apparatus for improving the power efficiency of telecommunications devices.

FIG. 4 shows an exemplary implementation 400 of apparatus 100 for improving the power efficiency of telecommunications device 206. As shown in FIG. 4, implementation 400 may involve ORing power device 106 enabling regulated electrical power 212 to flow from regulated power input 104 to electrical components 208(1)-(N). In this example, the voltage level of unregulated electrical power 210 may measure below a certain threshold (such as the voltage level of regulated electrical power 212). As a result, ORing power device 106 may pass and/or direct regulated electrical power 212 (instead of unregulated electrical power 210) to electrical components 208(1)-(N).

Figure 5:
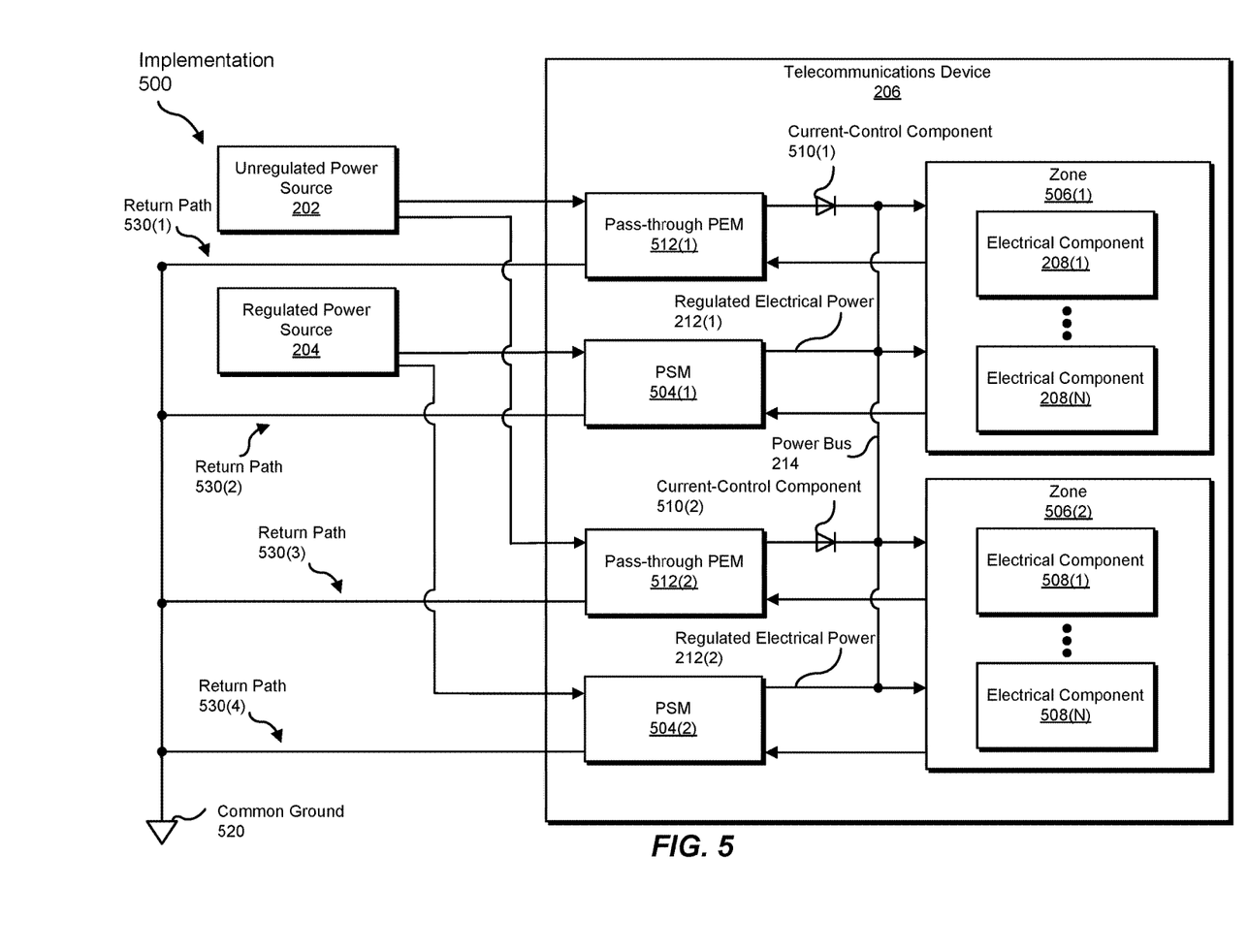
FIG. 5 is a block diagram of an exemplary implementation of an apparatus for improving the power efficiency of telecommunications devices.

FIG. 5 shows an exemplary implementation 500 of an apparatus for improving the power efficiency of telecommunications device 206. As shown in FIG. 5, implementation 500 may include zones 506(1)-(2) that, at least under some conditions, receive electrical power from different power sources. For example, zone 506(1) may include electrical components 208(1)-(N), and zone 506(2) may include electrical components 508(1)-(N). In this example, zone 506(1) may receive unregulated electrical power 210(1) from unregulated power source 202(1) while the voltage level of unregulated electrical power 210(1) is above a certain threshold (e.g., approximately 50 volts).

As shown in FIG. 5, implementation 500 may also include a current-control component 510(1) that passes unregulated electrical power 210(1) from unregulated power source 202(1). For example, current-control component 510(1) may include and/or represent an ORing diode or MOSFET that enables unregulated electrical power 210(1) to flow to zone 506(1) when the voltage level of unregulated electrical power 210(1) is above the voltage level of regulated electrical power 212(1) outputted by PSM 504(1). In the event that the voltage level of unregulated electrical power 210(1) dips or drops below the voltage level of regulated electrical power 212(1) outputted by PSM 504(1), current-control component 510(1) may prevent regulated electrical power 212(1) from flowing back toward unregulated power source 202(1). However, in the event that the voltage level of unregulated electrical power 210(1) rises again above the voltage level of regulated electrical power 212(1) due to charging of unregulated power source 202(1), current-control component 510(1) may again pass unregulated electrical power 210(1) to zone 506(1).

Similarly, PSM 504(1) may convert electrical power originating from regulated power source 204(1) into regulated electrical power 212(1) that flows to zone 506(1) in the event that the voltage level of unregulated electrical power 210(1) dips or drops below the voltage level of regulated electrical power 212(1). In this example, PSM 504(1) may output regulated electrical power 212(1) (at, e.g., approximately 50 volts). In addition, PSM 504(1) may include an internal ORing diode or MOSFET (not illustrated in FIG. 5) that enables regulated electrical power 212(1) to flow to zone 506(1) when the voltage level of unregulated electrical power 210(1) dips or drops below the voltage level of regulated electrical power 212(1). Additionally or alternatively, this internal ORing diode or MOSFET may prevent unregulated electrical power 210(1) from flowing back toward regulated power source 204(1) when the voltage level of unregulated electrical power 210(1) is above the voltage level of regulated electrical power 212(1).

As shown in FIG. 5, implementation 500 may also include a current-control component 510(2) that passes unregulated electrical power 210(2) from unregulated power source 202(2). For example, current-control component 510(2) may include and/or represent an ORing diode or MOSFET that enables unregulated electrical power 210(2) to flow to zone 506(2) when the voltage level of unregulated electrical power 210(2) is above the voltage level of regulated electrical power 212(2) outputted by PSM 504(2). In the event that the voltage level of unregulated electrical power 210(2) dips or drops below the voltage level of regulated electrical power 212(2) outputted by PSM 504(2), current-control component 510(2) may prevent regulated electrical power 212(2) from flowing back toward unregulated power source 202(2). However, in the event that the voltage level of unregulated electrical power 210(2) rises again above the voltage level of regulated electrical power 212(2) due to charging of unregulated power source 202(2), current-control component 510(2) may again pass unregulated electrical power 210(2) to zone 506(2).

Similarly, PSM 504(2) may convert electrical power originating from regulated power source 204(2) into regulated electrical power 212(2) that flows to zone 506(2) in the event that the voltage level of unregulated electrical power 210(2) dips or drops below the voltage level of regulated electrical power 212(2). In this example, PSM 504(2) may output regulated electrical power 212(2) (at, e.g., approximately 50 volts). In addition, PSM 504(2) may include an internal ORing diode or MOSFET (not illustrated in FIG. 5) that enables regulated electrical power 212(2) to flow to zone 506(2) when the voltage level of unregulated electrical power 210(2) dips or drops below the voltage level of regulated electrical power 212(2). Additionally or alternatively, this internal ORing diode or MOSFET may prevent unregulated electrical power 210(2) from flowing back toward regulated power source 204(2) when the voltage level of unregulated electrical power 210(2) is above the voltage level of regulated electrical power 212(2).

While FIGS. 1-5 show a variety of electrical components and configurations that may help improve the power efficiency of telecommunications devices, embodiments of the instant disclosure are not limited to the electrical components and configurations illustrated in FIGS. 1-5. For example, apparatus 100 may include one or more EMI filters, additional ORing power devices (such as diodes and/or MOSFETs), power sources, and/or capacitors that are not illustrated in FIGS. 1-5.

Figure 6:
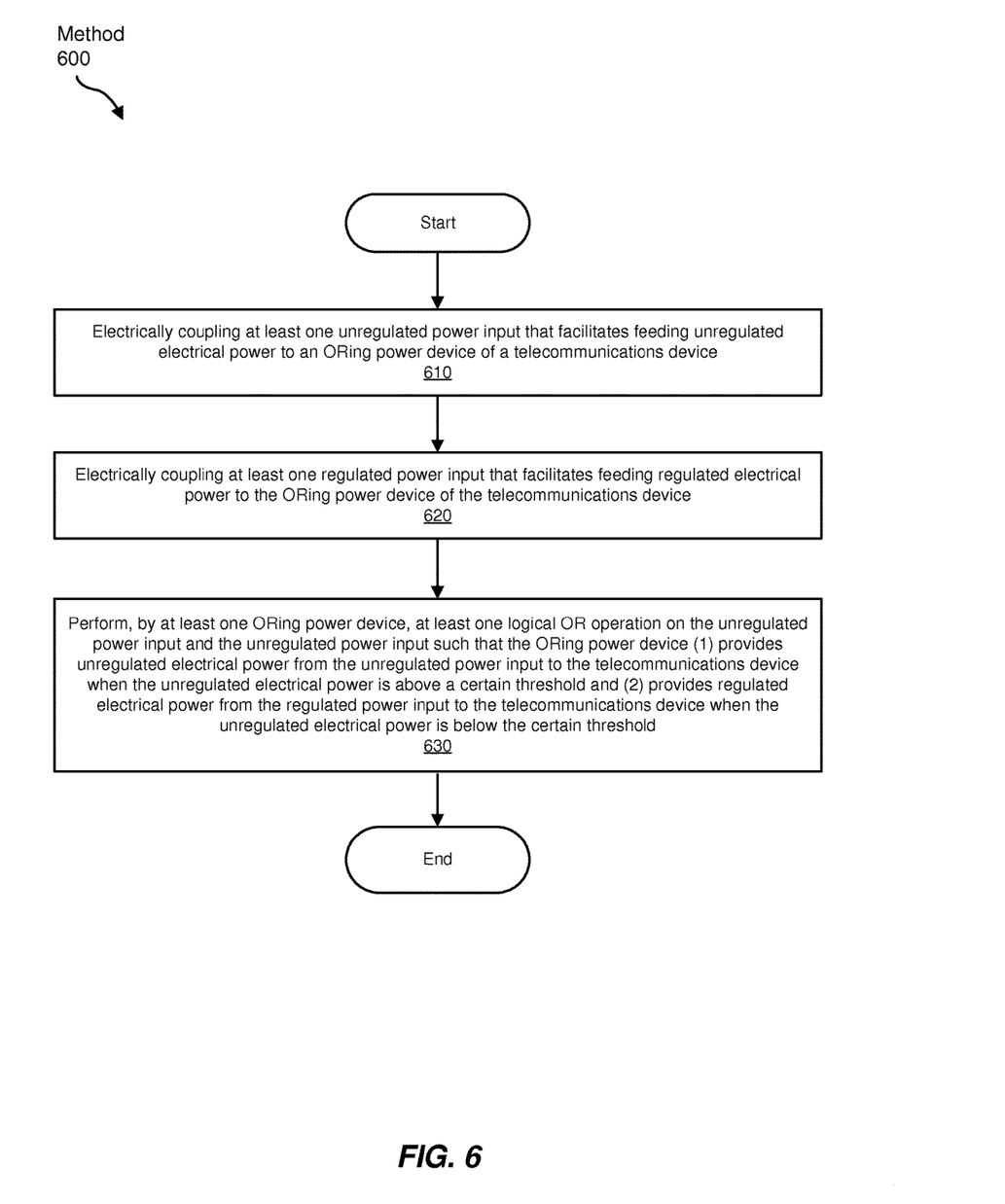
FIG. 6 is a flow diagram of an exemplary method for improving the power efficiency of telecommunications devices.

FIG. 6 is a flow diagram of an exemplary method 600 for improving the power efficiency of telecommunications devices. Method 600 may include the step of electrically coupling at least one unregulated power input that facilitates feeding unregulated electrical power to an ORing power device of a telecommunications device (610). This electrical-coupling step may be performed in a variety of ways. In one example, the step may be performed by physically connecting unregulated power input 102 to ORing power device 106. For example, a telecommunications equipment manufacturer may manufacture a printed circuit board (PCB) for a telecommunications device that is redundantly powered by power sources 202 and 204. When manufacturing the PCB, the telecommunications equipment manufacturer may assemble the telecommunications device by physically connecting unregulated power input 102 to ORing power device 106.

Additionally or alternatively, step 610 may be performed by powering on power sources 202 and 204 connected to ORing power device 106 via power inputs 102 and 104, respectively. For example, a user or automated system may power on power sources 202 and 204 to begin using the telecommunications device. This process of powering on the telecommunications device may enable unregulated power input 102 to feed and/or provide unregulated electrical power 210 to ORing power device 106 within the telecommunications device.

Returning to FIG. 6, method 600 may also include the step of electrically coupling at least one regulated power input that facilitates feeding regulated electrical power to the ORing power device of the telecommunications device (620). This electrically coupling step may be performed in a variety of ways. In one example, the step may be performed by physically connecting unregulated power input 102 to ORing power device 106. For example, and as described above, a telecommunications equipment manufacturer may manufacture a PCB for a telecommunications device that is redundantly powered by power sources 202 and 204. When manufacturing the PCB, the telecommunications equipment manufacturer may assemble the telecommunications device by physically connecting regulated power input 104 to ORing power device 106.

Additionally or alternatively, step 620 may be performed by powering on power sources 202 and 204 connected to ORing power device 106 via power inputs 102 and 104, respectively. For example, a user or automated system may power on power sources 202 and 204 to begin using the telecommunications device. This process of powering on the telecommunications device may enable regulated power input 104 to feed and/or provide regulated electrical power 212 to ORing power device 106 within the telecommunications device.

Returning to FIG. 6, method 600 may also include the step of performing at least one logical OR operation on the unregulated power input and the regulated power input (630). This ORing step may be performed in a variety of ways. In one example, the step may be performed based at least in part on the voltage levels of unregulated electrical power 210 and regulated electrical power 212. For example, ORing power device 106 may provide unregulated electrical power 210 to the telecommunications device when unregulated electrical power 210 is above a certain threshold. In this example, ORing power device 106 may provide regulated electrical power 212 to the telecommunications device when regulated electrical power 212 is below that threshold.

As a specific example, ORing power device 106 may cause unregulated electrical power 210 to flow to electrical components 208(1)-(N) of the telecommunications device when the voltage level of unregulated electrical power 210 is above the voltage level of regulated electrical power 212. In this example, ORing power device 106 may also cause regulated electrical power 212 to flow to electrical components 208(1)-(N) of the telecommunications device when the voltage level of unregulated electrical power 210 is below the voltage level of regulated electrical power 212.

Figure 7:
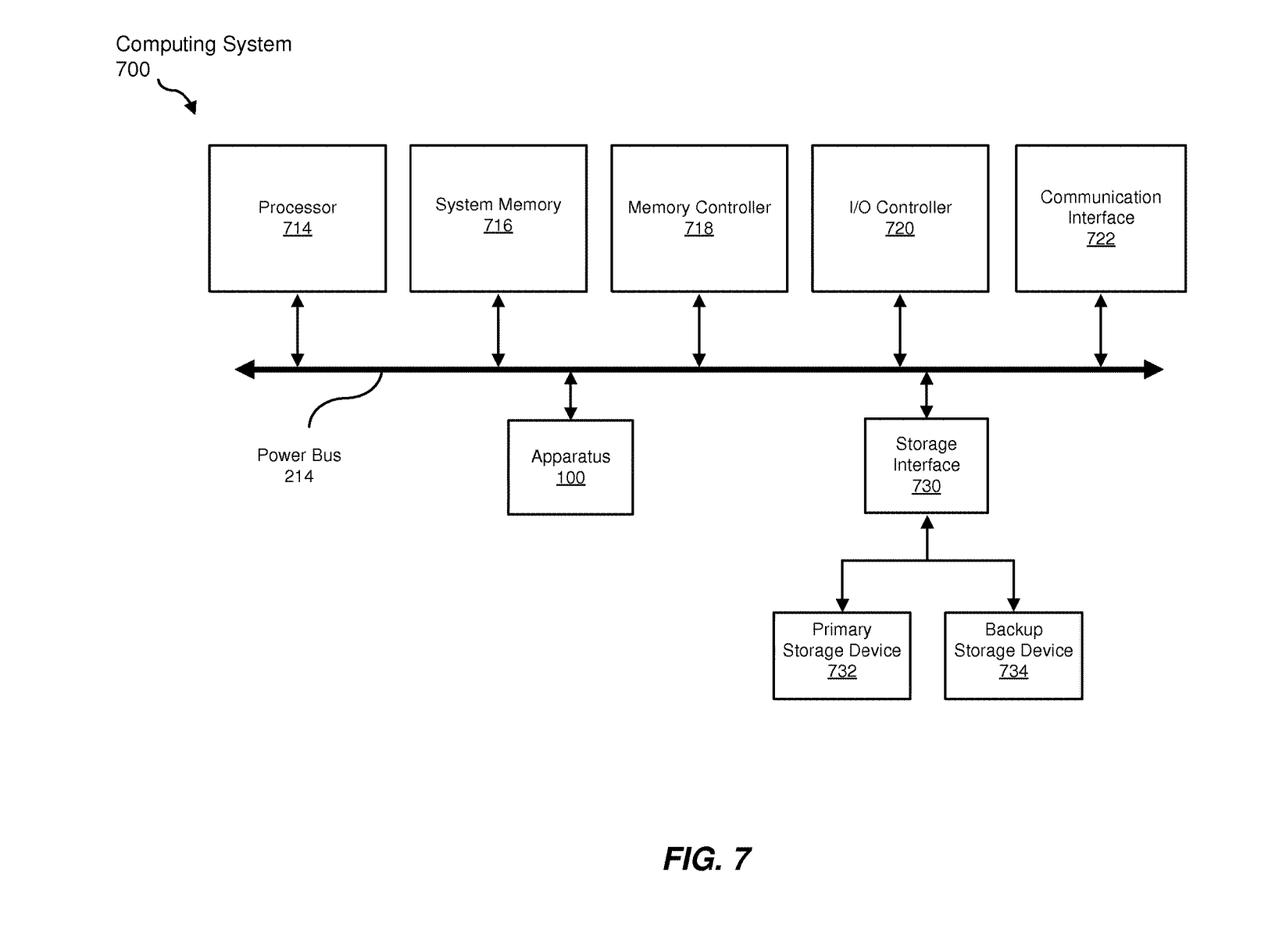
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 6. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which receive electrical power from power bus 214. Power bus 214 generally represents any type or form of infrastructure capable of facilitating power distribution to one or more components of a computing device.

Memory controller 718 generally represents any type or form of device capable of handling memory or data or controlling communication between one or more components of computing system 700. For example, in certain embodiments memory controller 718 may control communication between processor 714, system memory 716, and I/O controller 720. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a hybrid power configuration that provides fault isolation to facilitate continued operation in the event of a system fault, the hybrid power configuration comprising:
      a first unregulated power input that facilitates feeding unregulated electrical power to a first zone of a telecommunications device via a first pass-through Power Entry Module (PEM) that includes:
         a first ElectroMagnetic Interference (EMI) filter that conditions the unregulated electrical power; and
         a first return path that carries the unregulated electrical power to a common ground; and
      a first regulated power input that facilitates feeding regulated electrical power to the first zone of the telecommunications device via a first Power Supply Module (PSM) that:
         performs Direct Current (DC) to DC conversion on the regulated electrical power; and
         includes a second return path that carries the regulated electrical power to the common ground; and
      a second unregulated power input that facilitates feeding unregulated electrical power to a second zone of the telecommunications device via a second pass-through PEM that includes:
         a second EMI filter that conditions the unregulated electrical power; and
         a third return path that carries the unregulated electrical power to a common ground; and
      a second regulated power input that facilitates feeding regulated electrical power to the second zone of the telecommunications device via a second PSM that:
         performs DC to DC conversion on the regulated electrical power; and
         includes a fourth return path that carries the regulated electrical power to the common ground; and
   wherein:
      the first zone of the telecommunications device comprises a set of electrical components that collectively facilitate communication with at least one additional telecommunications device;
      the second zone of the telecommunications device comprises a redundant set of electrical components capable of facilitating communication with the additional telecommunications device in the event that the first zone of the telecommunications device experiences a system fault;

the telecommunications device:
   operates primarily on the unregulated electrical power; and
   operates on the regulated electrical power in the event that the unregulated electrical power drops below a certain threshold; and
at least one ORing power device that:
   provides the unregulated electrical power to the telecommunications device when the unregulated electrical power is above the certain threshold; and
   provides the regulated electrical power to the telecommunications device when the unregulated electrical power is below the certain threshold.

2. The apparatus of claim 1, wherein the first unregulated power input is connected to a battery from which the first unregulated power input receives the unregulated electrical power to feed to the telecommunications device.

3. The apparatus of claim 2, wherein the first pass-through PEM feeds the unregulated electrical power originating from the battery to the telecommunications device by way of the ORing power device when the unregulated electrical power is above the certain threshold.

4. The apparatus of claim 1, wherein the first regulated power input is connected to a power source from which the first regulated power input receives the regulated electrical power to feed to the telecommunications device.

5. The apparatus of claim 4, wherein the first PSM feeds the regulated electrical power originating from the power source to the telecommunications device by way of the ORing power device when the unregulated electrical power is below the certain threshold.

6. The apparatus of claim 1, wherein the ORing power device comprises at least one of:
   a Metal Oxide Semiconductor Field Effect Transistor (MOSFET); and
   an ORing diode.

7. The apparatus of claim 1, wherein the ORing power device provides the unregulated electrical power or the regulated electrical power to the telecommunications device by way of a logical OR operation whose output depends on whether the unregulated electrical power is above the certain threshold.

8. The apparatus of claim 1, wherein:
   the first unregulated power input and the first regulated power input each comprise a Direct Current (DC) power input; and
   the unregulated electrical power and the regulated electrical power each comprise Direct Current (DC) electrical power.

9. The apparatus of claim 1, wherein:
   the ORing power device provides the unregulated electrical power or the regulated electrical power to the first zone of the telecommunications device or the second zone of the telecommunications device;
   the set of electrical components and the redundant set of electrical components each comprise at least one of:
      a Field-Replaceable Unit (FRU);
      a Physical Interface Card (PIC);
      a Flexible PIC Concentrator (FPC);
      a Switch Interface Board (SIB); and
      a fan tray.

10. The apparatus of claim 1, wherein the ORing power device maintains the regulated electrical power from the first regulated power input as a backup power feed in the event that the unregulated electrical power from the first unregulated power input drops below the certain threshold.

11. A telecommunications device comprising:
a power distribution unit that distributes electrical power to the telecommunications device and provides fault isolation to facilitate continued operation of the telecommunications device in the event of a system fault, the power distribution unit comprising:
   a first unregulated power input that facilitates feeding unregulated electrical power to a telecommunications device via at least one pass-through Power Entry Module (PEM) that includes:
      a first ElectroMagnetic Interference (EMI) filter that conditions the unregulated electrical power; and
      a first return path that carries the unregulated electrical power to a common ground; and
   a first regulated power input that facilitates feeding regulated electrical power to the first zone of the telecommunications device via a first Power Supply Module (PSM) that:
      performs Direct Current (DC) to DC conversion on the regulated electrical power; and
      includes a second return path that carries the regulated electrical power to the common ground; and
   a second unregulated power input that facilitates feeding unregulated electrical power to a second zone of the telecommunications device via a second pass-through PEM that includes:
      a second EMI filter that conditions the unregulated electrical power; and
      a third return path that carries the unregulated electrical power to a common ground; and
   a second regulated power input that facilitates feeding regulated electrical power to the second zone of the telecommunications device via a second PSM that:
      performs DC to DC conversion on the regulated electrical power; and
      includes a fourth return path that carries the regulated electrical power to the common ground; and
   wherein:
      the first zone of the telecommunications device comprises a set of electrical components that collectively facilitate communication with at least one additional telecommunications device;
      the second zone of the telecommunications device comprises a redundant set of electrical components capable of facilitating communication with the additional telecommunications device in the event that the first zone of the telecommunications device experiences a system fault;
      the telecommunications device:
         operates primarily on the unregulated electrical power; and
         operates on the regulated electrical power in the event that the unregulated electrical power drops below a certain threshold; and
      at least one ORing power device that:
         provides the unregulated electrical power to the telecommunications device when the unregulated electrical power is above the certain threshold; and
         provides the regulated electrical power to the telecommunications device when the unregulated electrical power is below the certain threshold.

12. The telecommunications device of claim 11, wherein the first unregulated power input is connected to a battery from which the first unregulated power input receives the unregulated electrical power to feed to the telecommunications device.

13. The telecommunications device of claim 12, wherein the first pass-through power entry module feeds the unregulated electrical power originating from the battery to the telecommunications device by way of the ORing power device when the unregulated electrical power is above the certain threshold.

14. The telecommunications device of claim 11, wherein the first regulated power input is connected to a power source from which the first regulated power input receives the regulated electrical power to feed to the telecommunications device.

15. The telecommunications device of claim 14, wherein the first PSM feeds the regulated electrical power originating from the power source to the telecommunications device by way of the ORing power device when the unregulated electrical power is below the certain threshold.

16. The telecommunications device of claim 11, wherein the ORing power device comprises at least one of:
   a Metal Oxide Semiconductor Field Effect Transistor (MOSFET); and
   an ORing diode.

17. The telecommunications device of claim 11, wherein the ORing power device provides the unregulated electrical power or the regulated electrical power to the telecommunications device by way of a logical OR operation whose output depends on whether the unregulated electrical power is above the certain threshold.

18. The telecommunications device of claim 11, wherein:
   the first unregulated power input and the first regulated power input each comprise a Direct Current (DC) power input; and
   the unregulated electrical power and the regulated electrical power each comprise Direct Current (DC) electrical power.

19. The telecommunications device of claim 11, wherein:
   the ORing power device provides the unregulated electrical power or the regulated electrical power to the first zone of the telecommunications device or the second zone of the telecommunications device;
   the set of electrical components and the redundant set of electrical components each comprise at least one of:
      a Field-Replaceable Unit (FRU);
      a Physical Interface Card (PIC);
      a Flexible PIC Concentrator (FPC);
      a Switch Interface Board (SIB); and
      a fan tray.

20. A method comprising:
   electrically coupling a first unregulated power input that facilitates feeding unregulated electrical power to a first zone of a telecommunications device via an ORing power device and a first pass-through Power Entry Module (PEM) that includes:
      a first ElectroMagnetic Interference (EMI) filter that conditions the unregulated electrical power; and
      a first return path that carries the unregulated electrical power to a common ground;
   electrically coupling a first regulated power input that facilitates feeding regulated electrical power to a first zone of the telecommunications device via the ORing power device and a Power Supply Module (PSM) that:
      performs Direct Current (DC) to DC conversion on the regulated electrical power; and
      includes a second return path that carries the regulated electrical power to the common ground;
   electrically coupling a second unregulated power input that facilitates feeding unregulated electrical power to a second zone of the telecommunications device via a second ORing power device and a second pass-through Power Entry Module (PEM) that includes:
      a second EMI filter that conditions the unregulated electrical power; and
      a third return path that carries the unregulated electrical power to the common ground;
   wherein:
      the first zone of the telecommunications device comprises a set of electrical components that collectively facilitate communication with at least one additional telecommunications device;
      the second zone of the telecommunications device comprises a redundant set of electrical components capable of facilitating communication with the additional telecommunications device in the event that the first zone of the telecommunications device experiences a system fault; and
      the telecommunications device:
         operates primarily on the unregulated electrical power; and
         operates on the regulated electrical power in the event that the unregulated electrical power drops below a certain threshold; and
   performing, by the ORing power device, at least one logical OR operation such that the ORing power device:
      provides the unregulated electrical power to the telecommunications device when the unregulated electrical power is above the certain threshold; and
      provides the regulated electrical power to the telecommunications device when the unregulated electrical power is below the certain threshold.

* * * * *